US009439227B2

(12) United States Patent
Wei

(10) Patent No.: US 9,439,227 B2
(45) Date of Patent: Sep. 6, 2016

(54) WIRELESS LOCAL AREA NETWORK ACCESS DEVICE AND METHOD OF CONTROLLING WIRELESS SIGNALS

(71) Applicant: HON HAI PRECISION INDUSTRY CO., LTD., New Taipei (TW)

(72) Inventor: Ya-Ti Wei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/227,031

(22) Filed: Mar. 27, 2014

(65) Prior Publication Data

US 2015/0230278 A1 Aug. 13, 2015

(30) Foreign Application Priority Data

Feb. 10, 2014 (TW) .............................. 103104227 A

(51) Int. Cl.
*H04L 12/66* (2006.01)
*H04W 76/02* (2009.01)
*H04L 29/12* (2006.01)

(52) U.S. Cl.
CPC ........ *H04W 76/021* (2013.01); *H04L 61/2015* (2013.01); *Y02B 60/50* (2013.01)

(58) Field of Classification Search
CPC ....... H04W 52/02; H04Q 7/24; G06F 15/16; H04L 12/4641; H04L 12/2458; H04L 43/10; H04L 43/12; H04L 43/106; H04L 45/00
USPC ................ 370/400, 401, 389, 392, 311, 338, 370/351–356, 398, 241, 242, 244
See application file for complete search history.

(56) References Cited

U.S. PATENT DOCUMENTS

| | | | | |
|---|---|---|---|---|
| 7,515,542 | B2* | 4/2009 | Hertoghs | H04L 12/4633 370/236.2 |
| 7,647,422 | B2* | 1/2010 | Singh | H04L 12/4641 370/351 |
| 7,733,833 | B2* | 6/2010 | Kalika | H04L 12/2456 370/338 |
| 7,827,310 | B1* | 11/2010 | Haberman | H04L 29/12028 709/245 |
| 2010/0039971 | A1* | 2/2010 | Lor | H04W 52/0274 370/311 |

FOREIGN PATENT DOCUMENTS

| | | |
|---|---|---|
| CN | 101796774 A | 8/2010 |
| CN | 102104938 A | 6/2011 |
| CN | 103179536 | 6/2013 |
| TW | I289396 | 11/2007 |
| TW | 201330568 | 7/2013 |

* cited by examiner

*Primary Examiner* — Hanh N Nguyen
(74) *Attorney, Agent, or Firm* — Zhigang Ma

(57) ABSTRACT

A WLAN access device includes a connecting module, a PING detecting module, and a wireless signal control module. The connecting module obtains an IP address from a DHCP. After the connecting module getting the IP address, the PING detecting module sends the PING messages to a gateway, and receives the corresponding response messages from the gateway. The wireless signal control module enables a wireless module of the WLAN access device to transmit wireless signals when the PING detecting module receives the corresponding response messages from the gateway. The present disclosure further provides a method of controlling wireless signals of the WLAN access device.

8 Claims, 3 Drawing Sheets

WIRELESS LOCAL AREA NETWORK ACCESS DEVICE AND METHOD OF CONTROLLING WIRELESS SIGNALS

BACKGROUND

1. Technical Field

Embodiments of the present disclosure generally relate to wireless local area network (WLAN) access devices, and more particularly to a WLAN access device and method of controlling wireless signals.

2. Description of Related Art

Using WLAN on smart phones and personal computers is more and more popular. A WLAN access device is in a working state even when disconnected from the WLAN network. Mobile devices will repeatedly connect to the WLAN network, which wastes the power of the WLAN access devices and the mobile devices, and mobile devices will be unable to connect to another effective network.

SUMMARY OF THE INVENTION

A WLAN access device includes a connecting module, a PING detecting module, and a wireless signal control module. The connecting module obtains an IP address from a DHCP. After the connecting module getting the IP address, the PING detecting module sends the PING messages to a gateway, and receives the corresponding response messages from the gateway. The wireless signal control module opens a wireless module of the WLAN access device to transmit wireless signals when the PING detecting module receives the corresponding response messages from the gateway. The present disclosure further provides a method of controlling wireless signals of the WLAN access device.

Other advantages and novel features will become more apparent from the following detailed description when taken in conjunction with the accompanying drawings.

DETAILED DESCRIPTION

Figure 1:
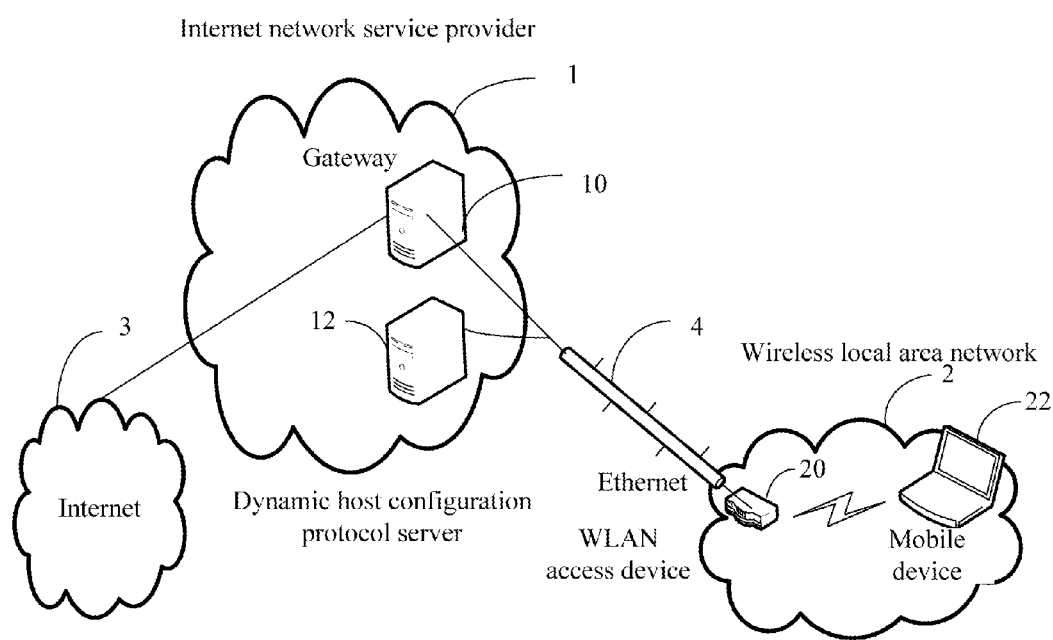
FIG. 1 is a schematic diagram of an application environment of a WLAN access device in accordance with one embodiment of the present disclosure, showing one example of operation of the application environment.

The embodiments are illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used hereinafter, refers to logic embodied in hardware or firmware, or to a collection of software instructions, written in a programming language, such as, Java, C, or assembly. One or more software instructions in the modules may be embedded in firmware such as in an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 is a schematic diagram of an application environment of a WLAN access device 20 in accordance with one embodiment of the present disclosure. In the present embodiment, an internet service provider 1 provides a connection to the Internet 3. The internet service provider 1 includes a gateway 10 and a dynamic host configuration protocol server (DHCP) 12. The internet service provider 1 connects the WLAN 2 via Ethernet 4 The WLAN 2 includes a WLAN access device 20 and a mobile device 22. The WLAN access device 20 transmits data between the Internet 3 and the WLAN 2. In the present embodiment, the WLAN access device 20 can detect whether the WLAN access device 20 and internet service provider 1 are still connected. The WLAN access device 20 disconnects unusable networks in real time according to the network connection state of the WLAN access device 20 and the internet service provider 1 to avoid the mobile devices connecting to unusable networks repeatedly to reduce the consumption of power supply of the mobile devices 22 and the WLAN access devices 20.

Figure 2:
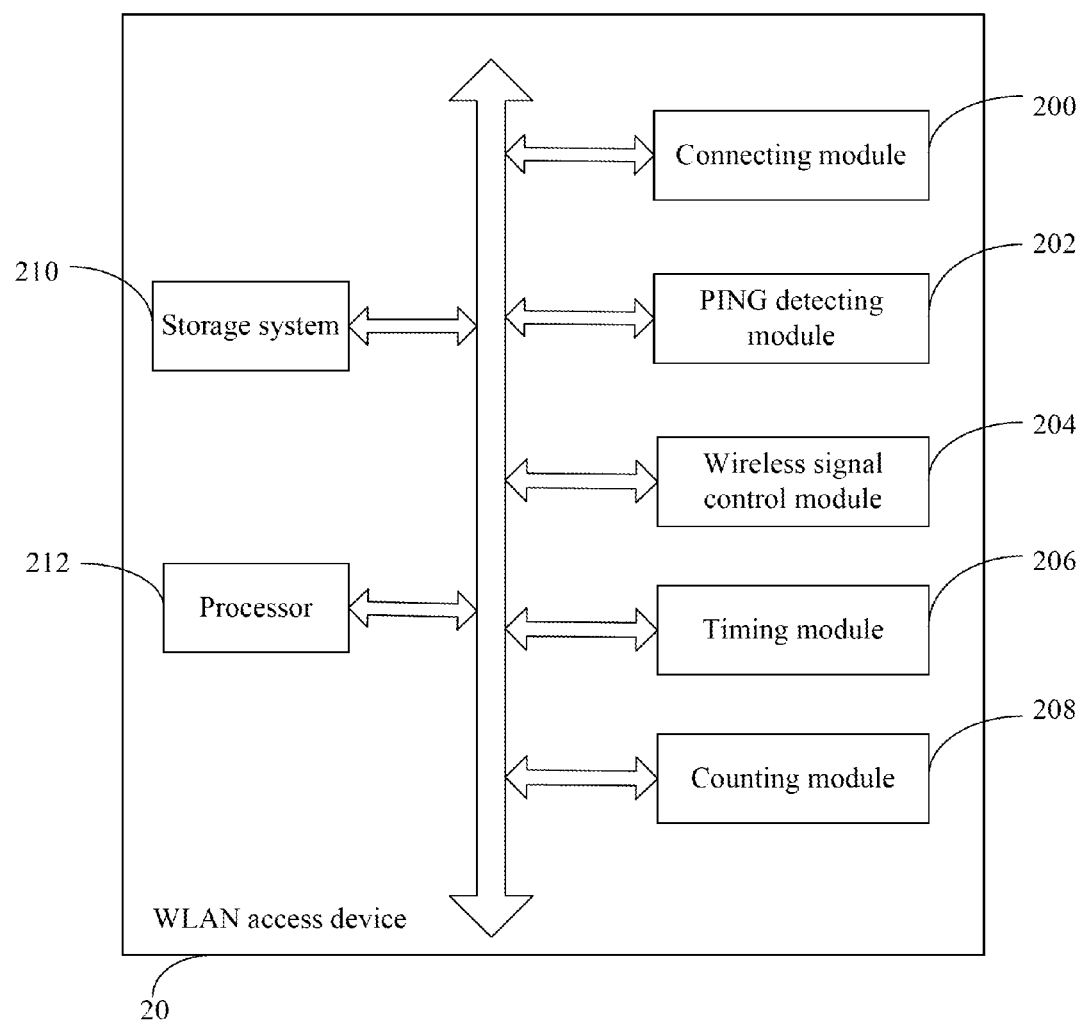
FIG. 2 is a block diagram of functional module of the WLAN access device in FIG. 1.

FIG. 2 is a block diagram of functional module of the WLAN access device in FIG. 1. In the present embodiment, the WLAN access device 20 includes a connecting module 200, a PING detecting module 202, and a wireless signal control module 204, a timing module 206, a counting module 208, a storage system 210, and a processor 212. The storage system 210 includes the software code used to implement the function of the connecting module 200, the PING detecting module 202, the wireless signal control module 204, the timing module 206, and the counting module 208. The processor 212 is used to perform the software code to achieve the above module.

In the present embodiment, the connecting module 200 connects a DHCP 12 and tries to obtain an IP address from the DHCP 12. The PING detecting module 202 sends a PING message to gateway 10, and receives the corresponding response message from the gateway 10 after using the obtained IP address. The wireless signal control module 204 enables a wireless module of the WLAN access device 20 to transmit wireless signals when the PING detecting module 202 receives the corresponding response messages from the gateway 10.

In another embodiment, the WLAN access device 20 further includes a timing module 206. The timing module 206 sets a first interval and a second interval. The connecting module 200 connects the DHCP 12 and tries to obtain the IP address again after the first interval when the connecting module 200 does not obtain the IP address from the DHCP 12. The connecting module 200 connects the DHCP 12 and tries to obtain the IP address again after the second interval when the PING detecting module 202 does not receive the corresponding response messages from the gateway 10.

In another embodiment, the timing module 206 sets a third interval and a fourth interval. The connecting module 200 sends the PING messages to the gateway 10 and receives the corresponding response messages from the gateway 10 after the third interval to detect whether the WLAN access device 20 and the gateway 10 are still connected when the PING detecting module 202 receives the corresponding response messages from the gateway 10. Wireless module of the WLAN access device enables continuously when the PING detecting module 202 receives the corresponding response messages from the gateway. The connecting module 200 sends the PING messages to the gateway and receives the corresponding response messages from the gateway after the fourth interval when the PING detecting module 202 does not receive the corresponding response messages from the gateway.

In the present embodiment, the WLAN access device 20 includes a counting module 208, the counting module 208 sets a default number, and counts a number of the PING messages that the PING detecting module 202 sends without receiving the corresponding response messages from the gateway 10. Then the PING detecting module 202 checks whether the counted number exceeds the default number. The PING detecting module 202 sends the PING messages to the gateway 10 and receives the corresponding response messages from the gateway 10 after the fourth interval when the counted number does not exceed the default number. The wireless signal control module 204 disables the wireless module when the counted number exceeds the default number.

The timing module 206 sets the fifth interval. The connecting module 200 connects the DHCP and tries to obtain an IP address from the DHCP 12 again after the fifth interval when the wireless signal control module 204 disables the wireless module to detect whether the WLAN access device 20 and the internet service provider 1 are connected.

The timing module 206 sets an interval to detect whether the WLAN access device 20 and the internet service provider 1 are still connected to avoid mobile devices connecting to unusable networks continuously and saving the power of the WLAN access devices 20 and mobile devices 22. The counting module 208 can set the default number freely according to different demand of the users.

Figure 3:
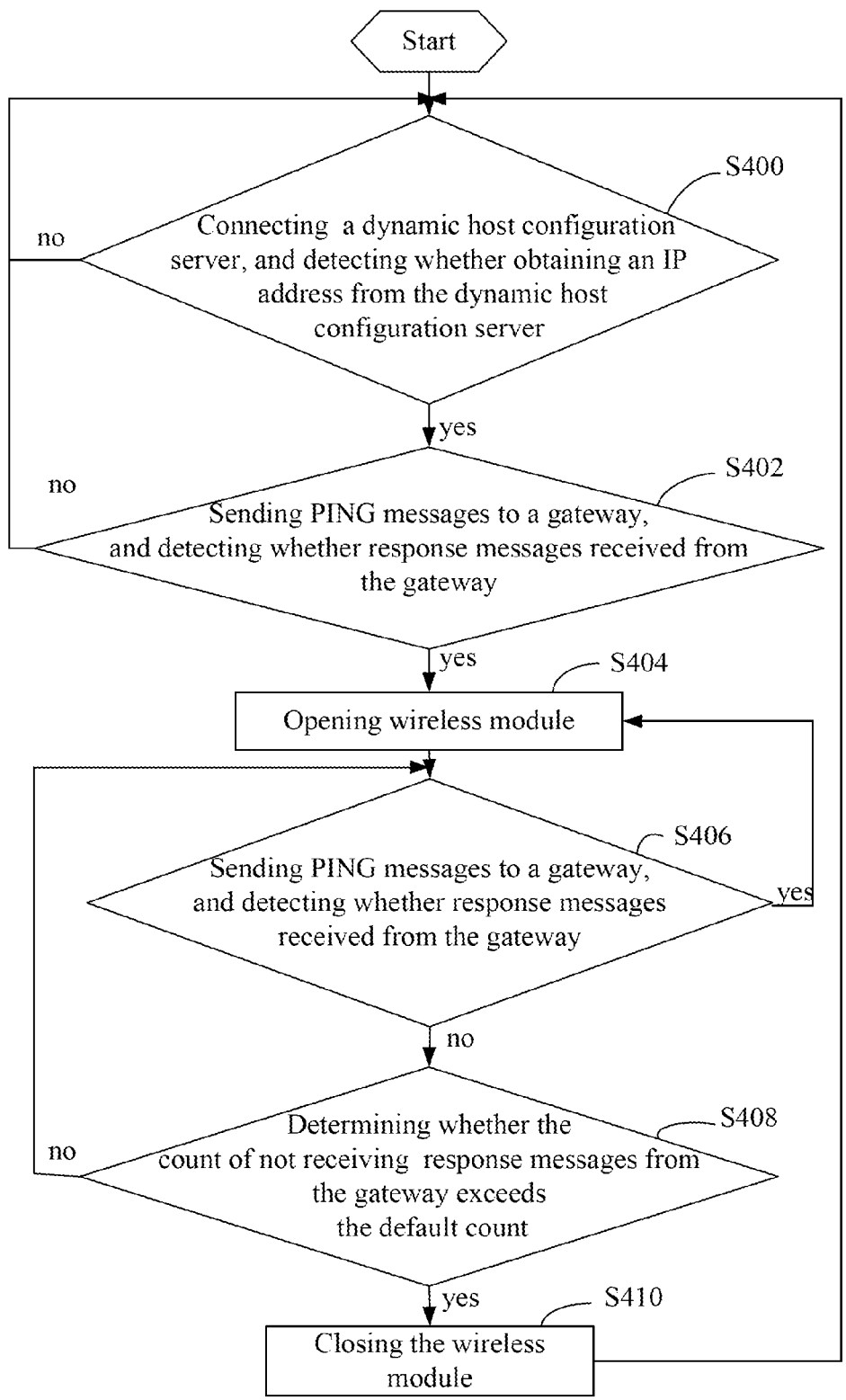
FIG. 3 is a flowchart of one embodiment of a method controlling wireless signals in accordance with the present disclosure.

FIG. 3 is a flowchart of one embodiment of a method controlling wireless signals The method utilizes the WLAN access devices 20 of FIG. 2. In the embodiment, the method is carried out in the application environment illustrated in FIG. 1, and is executed by the connecting module 200, the PING detecting module 202, and the wireless signal control module 204, the timing module 206, and the counting module 208 of the WLAN access devices 20 (see FIG. 2).

In block S400, the connecting module 200 connects the DHCP 12 and tries to obtain an IP address from a DHCP 12, and detects whether the connecting module 200 obtains an IP address from the DHCP 12. The connecting module 200 connects the DHCP 12 and tries to obtain an IP address from the DHCP 12 after the first interval when the connecting module 200 does not obtain the IP address from the DHCP 12.

In block S402, the PING detecting module 202 sends the PING messages to the gateway 10, and detects whether the PING detecting module 202 receives the corresponding response messages from the gateway 10 when the connecting module 200 obtains the IP address. The connecting module 200 connects the DHCP 12 and tries to obtain an IP address from the DHCP 12 after the second interval when the PING detecting module 202 does not receive the corresponding response messages from the gateway 10.

In the block S404, the wireless signal control module 204 enables a wireless module of the WLAN access device to transmit wireless signals when the PING detecting module 202 receives the corresponding response messages from the gateway 10.

In block S406, the PING detecting module 202 sends the PING messages to the gateway 10 and receives the corresponding response messages from the gateway 10 after the third interval when the PING detecting module 202 receives the corresponding response messages from the gateway 10 detecting whether the WLAN access device 20 and the gateway 10 are connects. The wireless module of the WLAN access device enables continuously when the PING detecting module receives the corresponding response messages from the gateway.

In block S408, the PING detecting module 202 counts a number of the PING messages that the PING detecting module sends without receiving the corresponding response messages from the gateway 10 and detects whether the counted number exceeds the default number. The connecting module 200 sends the PING messages to the gateway 10 and receives the corresponding response messages from the gateway 10 after the fourth interval when the counted number does not exceed the default number.

In block S410, the wireless signal control module 204 disables the wireless module, when the counted number exceeds the default number. Then the connecting module 200 connects a DHCP 12 and tries to obtain an IP address from the DHCP 12 again after the fifth interval to detect whether the WLAN access device 20 and the internet service provider 1 connected.

In summary, the WLAN access device 20 and the method of controlling wireless signals the above-described WLAN access device 20 can avoid connecting a unusable networks continuously, thus saving the power of the WLAN access devices 20 and mobile devices 22 to improve the experience of users of connecting to wireless networks.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalents.

What is claimed is:

1. A wireless local area network (WLAN) access device, connected with a dynamic host configuration protocol (DHCP) server and a gateway, comprising at least one processor, a storage system, and one or more programs stored in the storage system and executed by the at least one processor, the one or more programs comprising instructions for:
   connecting to the DHCP server and obtaining an internet protocol (IP) address from the DHCP server;
   sending packet internet groper (PING) messages to the gateway by using the obtained IP address and receiving a corresponding response message from the gateway;
   enabling a wireless module of the WLAN access device when the corresponding response message is received from the gateway;
   setting a first interval and a second interval;
   when the IP address is not obtained, connecting to the DHCP server, after the first interval, and obtaining an IP address from the DHCP server again;
   when the corresponding response message is not received from the gateway, connecting to the DHCP server, after the second interval, and obtaining an IP address from the DHCP server again.

2. The WLAN access device of claim 1, wherein the one or more programs further comprise instructions for:
   sending the PING messages to the gateway and receiving the corresponding response messages from the gateway again after enabling the wireless module of the WLAN access device.

3. The WLAN access device of claim 2, wherein the one or more programs further comprise instructions for:
   setting a third interval and a fourth interval;

when the corresponding response messages is received from the gateway, sending the PING message to the gateway and receiving the corresponding response message from the gateway after the third interval so as to continuously detect whether the WLAN access device and the gateway are still connected; and when the corresponding response messages is not obtained from the gateway, sending the PING messages to the gateway and receiving the corresponding response messages from the gateway after the fourth interval.

4. The WLAN access device of claim 3, the one or more programs further comprise instructions for:

setting a default number, and counting a number of the PING messages that the PING detecting module sends without receiving the corresponding the corresponding response messages from the gateway;

disabling the wireless module of the WLAN access device when the counted number exceeds the default number.

5. A method of controlling wireless signals of a wireless local area network (WLAN) access device connected to a dynamic host configuration protocol (DHCP) server and a gateway, the method comprising:

connecting the DHCP server and obtaining an internet protocol (IP) address from the DHCP server;

sending packet internet groper (PING) message to the gateway by using the obtained IP address and receiving a corresponding response message from the gateway;

enabling a wireless module of the WLAN access device after receiving response messages from the gateway;

setting a first interval and a second interval;

when the IP address is not obtained, connecting to the DHCP server, after the first interval, and obtaining an IP address from the DHCP server again;

when the corresponding response message is not received from the gateway, connecting to the DHCP server, after the second interval, and obtaining an IP address from the DHCP server again.

6. The method of claim 5, further comprising:

sending the PING message to the gateway and receiving the corresponding response message from the gateway again after enabling the wireless module of the WLAN access device.

7. The method of claim 6, further comprising:

setting a third interval and a fourth interval;

when the corresponding response messages is received from the gateway, sending the PING message to the gateway and receiving the corresponding response message from the gateway after the third interval so as to continuously detect whether the WLAN access device and the gateway are still connected; and when the corresponding response messages is not obtained from the gateway, sending the PING messages to the gateway and receiving the corresponding response messages from the gateway after the fourth interval.

8. The method of claim 7, further comprising:

setting a default number, and counting a number of the PING messages that does not receive the corresponding response messages from the gateway; and disabling the wireless module when the counted number exceeds the default number.

\* \* \* \* \*